F. J. Smiley.
Corn-Planter.

N° 71917       Patented Dec. 10, 1867.

Witnesses
Wilson L. Mead
Otto L. Johnston

Inventor:
Frank J. Smiley

F. J. Smiley.
Corn-Planter.
№ 71917   Patented Dec. 10, 1867.
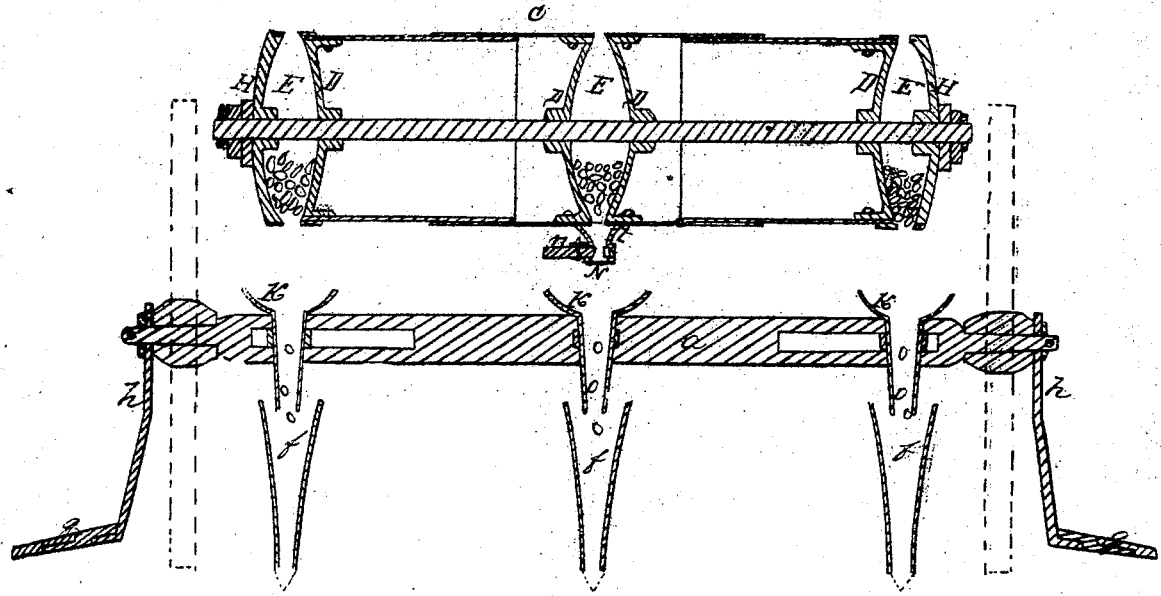
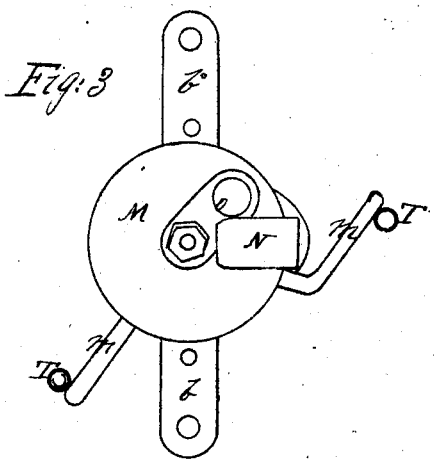

United States Patent Office.

FRANK J. SMILEY, OF MARSHALL, MICHIGAN.

Letters Patent No. 71,917, dated December 10, 1867.

IMPROVEMENT IN CORN-PLANTERS.

*The Schedule referred to in these Letters Patent and making part of the same.*

TO ALL WHOM IT MAY CONCERN:

Be it known that I, FRANK J. SMILEY, of the city of Marshall, in the county of Calhoun, and State of Michigan, have invented a new and useful Improvement in Corn-Planters; and I do hereby declare the following to be a full, clear, and exact description of the same, reference being had to the annexed drawings, making a part of this specification, in which—

Figure 2 is a transverse section.

Figure 3 is an enlarged plane view of dropper.

Similar letters of reference indicate like parts in all of the figures.

Figure 1:
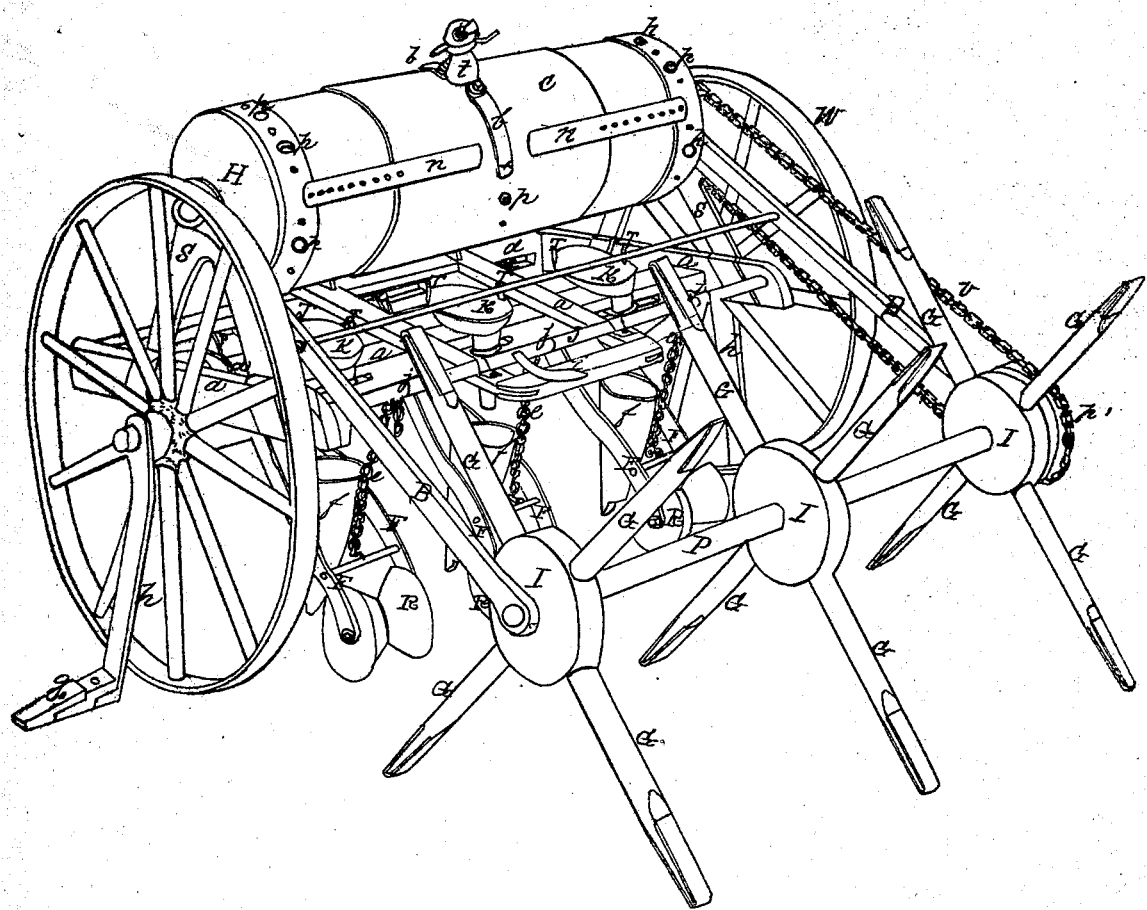
Figure 1 is a perspective view.

My invention has for its object the more uniform and certain dropping of corn or other seed, (especially when planted on uneven ground,) by means of what I term a "perambulator," the motion of which governs that of certain seed-dropping devices, in such a manner as to best tend to insure uniform and certain results; and the better to enable others skilled in the art to construct my invention, I will now proceed to describe the same.

The several parts constituting the frame of this machine are represented at a, which frame I usually make sufficiently wide to plant three rows of corn. *f* represents the hollow furrowers or shares, which are connected to hanging bars d, jointed to clips c, attached to the front girt of the frame, the outer clips being made adjustable in slots, and secured in place by wedges, or in any other convenient way, when set to correspond with the seed-discharge, for the required width between the rows.

The covering-rollers, the rims of which are deeply concave, resembling two conic frusta, are seen at R. They are hung to forked bars F, which are jointed to the hanging bars d, the whole being supported by chains e, hooked to adjustable hooks j on the rocking-shaft J, so as to be within easy reach of the driver, who, by means of a lever, i, can lift any of them over obstructions in the way.

The seed is contained within chambers E, formed by diaphragms or curved disks, as seen at D, inside of a cylinder, C, made in three parts, which slide together like the joints of a telescope, so as to be capable of adjustment to the several proper distances between the rows, and are secured in place by a pin at each end, entering into some one of a series of holes in the spring-catches n, secured to the central section. This cylinder is provided with tight heads H, forming walls for the end seed-chambers, and is keyed or otherwise attached to a central shaft, L, the end journals of which are hung in bearings in the standards S, attached to the ends of the frame.

Around the annular portions of the shell of the cylinder, within the seed-chambers E, aforesaid, I make suitable perforations, p, for the proper discharge of the seed into and through the dropping-tubes, only one of which, to avoid confusion, is exhibited at t, in addition to the enlarged view given in fig. 3. I provide as many of these tubes (usually light castings) as may be needed to cover all the holes, and furnish them with covering-bands b, for the double purpose of more conveniently screwing or bolting to the cylinder, and for covering the seed-holes therein not used in wide planting.

The projecting end of the drop-tube is provided with a short ear (see dotted lines, fig. 3) on one side, to which a partially-rotating slide, M, is pivoted, and on the other with a covering-guard, N, within which that portion of the slide containing the open seed-cup o works, and I usually make these cups in separate sets, of different calibre, and insert them in sockets in the slides, to vary the quantity of seed to be sown.

Each slide is provided with a pair of tappet-arms, m, as seen, which, as the cylinder revolves, impinge successively against two pins, T, in the edge of an open receiving-basin, K, in such a manner that one arm rotates the slide sufficiently to uncover the seed-cup and drop the seed into the basin, from whence it passes into the hollow share underneath to the furrow, and the other arm, striking against the opposite pin, returns the seed-cup to its former position under the guard.

I do not drive my seed-cylinders from the traction-wheels W of the machine, or their axle, as is usual, for the ridges, dead furrows, and other inequalities of the ground, render it next to impossible to plant at anything like equal distances in the rows. But I employ what I call a "perambulator" in the rear of the machine, its axle, P, being jointed by two connecting-bars, B, with the journals of the seed-cylinder so as to move concentrically with it.

My perambulator consists of any desired number of wooden bars G, arranged in equally-divided rows, (usually four, as seen,) in line with said axle, and connected to it directly, or to an attached hub, I, in radial lines, like the spokes of a wheel. I usually chamfer the ends of the spoke-bars wedge-fashion, to take firm hold of the ground in travelling, and shoe them with band-iron, to resist wear.

To enable the driver to run the courses parallel and equidistant between the rows, I hang to each end of the axle a pendent gauge-bar, h, the foot of which is turned horizontally, to swing clear of the ground, and fitted with lapped gauge-plates g, secured in any convenient way, so as to lengthen or shorten the projection, and serve as guides in running the adjacent sets of furrows.

I have not exhibited the seat, but I usually place it between the seed-cylinder and perambulator, so that the driver can see the seed as it falls into the basins, and in a position where he can lift and lock the perambulator above the ground by a lever, or any of the ordinary devices for such purpose, (not shown, to avoid complication,) when it is not proper to rotate the seeding-cylinder.

A pair of shafts for one horse, or pole for two, (not shown,) is attached to the frame in the usual place and manner.

The operation is as follows: The seed-chambers E being properly filled, and the required number of dropping-tubes t attached, with seed-cups to hold the proper quantity of seed, the telescopic-cylinder slides, shares, and pendent gauge-bars are adjusted and secured to agree with the desired distance between the rows. The driver then starts the team, and as the machine moves along, supported on its wheels, the points of the spokes of the perambulator take firm hold of the ground, and cause it to revolve in the bearings of its connecting-bars; the chain-gear rotates the seed-cylinder in exact ratio, and, as the dropping-tubes t revolve, and drop the seed in the furrows, as already described, the covering-rollers follow up and pack the ground firmly around the seed. As the perambulator stalks over the ground, it leaves visible marks, which serve as guides to start the machine after it is turned at the end of the field for a new course. The driver drives the machine so that the foot of the pendent gauge-bar follows the line of the adjacent marks, and can see if the spoke-bars strike the ground truly in line with the marks previously made in a lateral direction.

By this arrangement the dropping of the seed is not affected as when it is governed by the traction-wheels, which follow the undulations of the surface, inasmuch as the perambulator is not disturbed by any inequality of surface between its strides. But as it is absolutely necessary that the seed-cylinder and perambulator should move in concert, I prefer to gear them together, with a suitable chain, v, passing around and gearing into a cogged wheel, p', on the perambulator-axle and on the cylinder-shaft.

I do not claim broadly planting seed at regular intervals, in several rows at once, by means of an adjustable cylinder, or any other device, actuated by the machine in travelling over the ground; neither do I claim conveying the seed through adjustable furrowers, and covering and packing by concave rollers; but, having described my invention, What I do claim, and desire to secure by Letters Patent, is—

1. I claim, in combination with a wheeled machine for planting corn or other seed at regular intervals, a "perambulator," substantially as described, when hung concentrically to a revolving seed-cylinder, C, and operated in connection therewith, substantially in the manner and for the purpose herein specified.

2. I claim, when operated in connection with a revolving seed-cylinder, the arrangement and combination of the dropping-tubes t and their attachments with the tappet-pins T and receiving-basins K, for dropping and conveying the seed to the furrowers, substantially as set forth.

3. I claim the pendent gauge-bars h, in combination with the gauge-plates g, substantially as and for the purpose described.

FRANK J. SMILEY.

Witnesses:
　WILSON L. MEAD,
　OTTO L. JOHNSON.